United States Patent [19]
Hermet et al.

[11] 3,869,207
[45] Mar. 4, 1975

[54] LASER TELEMETER

[75] Inventors: Pierre Hermet, St. Cyr L'Ecole; Rodolphe Laesser, Montrouge, both of France

[73] Assignee: Compagnie Generale D'Electricite, Paris, France

[22] Filed: May 30, 1973

[21] Appl. No.: 365,328

[30] Foreign Application Priority Data
May 30, 1972 France .............................. 72.01935

[52] U.S. Cl. ........................... 356/4, 343/7.3, 356/5
[51] Int. Cl. .............................................. G01c 3/00
[58] Field of Search ...................... 356/4, 5; 343/7.3

[56] References Cited
UNITED STATES PATENTS
3,516,751   6/1970   Fruengal ................................ 356/4
3,666,367   5/1972   Farnsworth et al. .................... 356/5

FOREIGN PATENTS OR APPLICATIONS
1,204,296   9/1970   Great Britain ......................... 356/4

Primary Examiner—Maynard R. Wilbur
Assistant Examiner—S. C. Buczinski
Attorney, Agent, or Firm—Sughrue, Rothwell, Mion, Zinn & Macpeak

[57] ABSTRACT

Laser telemeter comprising a receiving photo-diode polarised in a break-down state and a servo-adjusting device regulating the polarisation voltage of that photo-diode at a level which may cause the triggering of a chronometer device receiving the pulses of that photo-diode. That telemeter comprises, moreover, a device for temporarily lowering that polarisation voltage during the interval of time separating the emission of a laser pulse and the receiving thereof on the photo-diode.

2 Claims, 2 Drawing Figures

PATENTED MAR 4 1975　　　　　　　　　　　　　　　　　3,869,207

LASER TELEMETER

The present invention concerns laser telemeters and more particularly laser telemeters comprising a photo-sensitive receiver constituted by a photo-diode.

A laser telemeter comprising a laser generator capable of emitting a light pulse towards a target and a photo-diode for receiving an echo of that pulse is known. That telemeter comprises, moreover, a servo-adjusting device receiving the electric noise pulses from the said photo-diode and controlling the reverse polarisation voltage in the break-down state of that photo-diode, so as to keep its noise level constant.

When a very low probability of the triggering of the measuring device by a noise pulse is required for that telemeter, it is necessary to fix that constant noise level at a low value which does not enable proper operation of the servo-adjusting device.

The aim of the present invention is to overcome that disadvantage.

The object of the present invention is a laser telemeter comprising:

A laser generator capable of emitting a light pulse towards a target;

A photo-sensitive receiver constituted by a photo-diode to receive an echo of the said light pulse;

A threshold device receiving the electric output pulses of the said photo-diode, suitable for blocking the electric pulses having a level lower than a pre-determined threshold and for transmitting the others;

A measuring device triggered at the instant of emission of the said light pulse and receiving the electric pulses transmitted by the said threshold device, for measuring the interval of time separating the emission of the said light pulse and the receiving of an electric pulse transmitted by that threshold device;

A servo-adjusting device receiving the output noise of the said photo-diode and controlling the reverse polarisation voltage in the breakdown state of that photo-diode at a first level so as to hold that noise at a constant value, that first level enabling the operation of the said servo-adjusting device;

A device for lowering temporarily the level of the polarisation voltage of the said photo-diode, the duration of that lowering being less than the response time of the said servo-adjusting device;

Characterised in that the said temporary lowering device comprises means for holding the said polarisation voltage at a second voltage during the interval of time separating the emission of the said light pulse and the receiving thereof on the said photo-diode, that second level being lower than the said first level but sufficiently high for the level of the electric pulse sent out by the said photo-diode on receiving the said echo to be higher than the said pre-determined threshold.

The present invention will be better understood from the following description given with reference to the accompanying drawing, by way of illustration but having no limiting character, in which.

Figure 1:
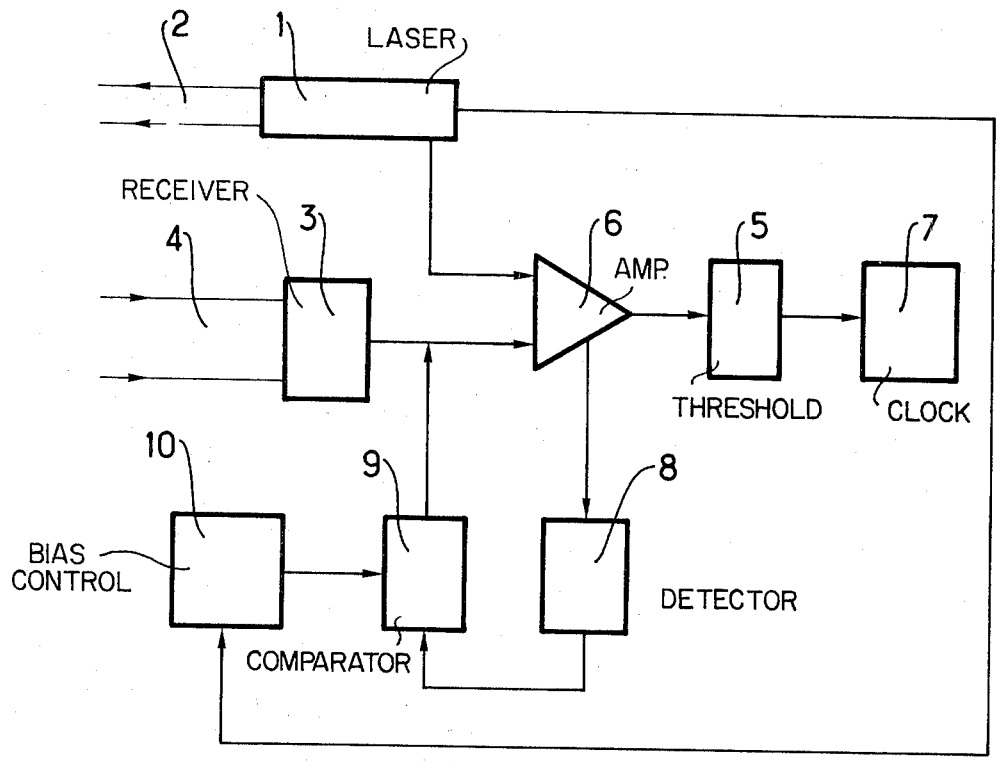
FIG. 1 is an operating diagram of an embodiment of the telemeter according to the invention.

FIG. 1 shows a laser telemeter comprising a laser generator 1 emitting a light pulse 2 towards a target, not shown, and a photo-sensitive receiver 3 constituted by a photo-diode receiving an echo 4 of the pulse 2.

That telemeter comprises, besides a threshold device 5 receiving, preferably through an amplifier 6, the electric output pulses of the receiver 3; the device 5 is suitable for blocking the electric pulses having a lower level than a predetermined threshold and for transmitting the others. That telemeter comprises, moreover, a measuring device 7 connected to the threshold device 5 and to the generator 1 through, for example, the amplifier 6; the device 7 is, for example, a clock capable of measuring the interval of time separating the emission of the pulse 2 and the receiving of an electric pulse transmitted by the device 5. That telemeter comprises also a servo-adjusting device receiving the output noise of the receiver 3 and controlling the reverse polarisation voltage in the breakdown state of the receiver 3 at a first level so as to hold the value of that noise constant, that first level enabling the operation of the servo-adjusting device. That servo-adjusting device may comprise, for example, a detector 8, connected to the amplifier 6, that detector 8 sending out a continuous signal representative, for example, of the level of the peak of the noise pulses of the receiver 3. That detector 8 is connected to a device 9 for controlling the reverse polarisation of the receiver 3, that device 9 possibly comprising, in a known way, a generator generating a reference voltage, a comparator and an amplifier. That telemeter comprises, lastly, a device 10 for lowering temporarily the reverse polarisation voltage of the receiver 3, the duration of that lowering being less than the response time of the servo-adjusting device. That device 10 is, for example, connected to the device 9 and to the laser generator 1; it comprises means for holding the reverse polarisation voltage of the receiver 3 at a second level during the interval of time separating the emission of the pulse 2 from the receiving of its echo 4 on the receiver 3. That second level, lower than the first level, is sufficiently high for the level of the electric pulse sent out by the receiver 3 on receiving the echo 4 and amplified by the amplifier 6 to be higher than the pre-determined threshold.

The operation of the telemeter shown in FIG. 1 is as follows:

When the laser generator 1 emits the light pulse 2, the measuring device 7 is brought into operation. The receiver 3 reverse polarised in the breakdown state sends out an electric pulse on receiving an echo 4 of the pulse 2. The photo-electric gain of the receiver 3 increases with its polarisation voltage; that receiver 3 emits also electric noise pulses whose level increases also rapidly with the value of that polarisation voltage. The variations in the gain and the noise of the receiver 3 as a function of the polarisation voltage depend on the temperature of that receiver. The servo-adjusting device has a sufficiently long response time to be insensitive to pulses of very short duration such as laser pulses; it receives, therefore, essentially, the noise pulses of the receiver 3. That servo-adjusting device operates in a known manner. The continuous output voltage of the device 8 is compared with the reference voltage of the device 9. The polarisation voltage of the receiver 3 is increased or decreased according to the sign of the error signal supplied by the comparator of the device 9 and amplified by its amplifier, so as to reduce the level of that error signal. By means of that servo-adjusting device, the polarisation voltage of the receiver 3 is adjusted to a first level such that the noise of that receiver remains substantially equal to a constant value corresponding to the reference voltage, whatever the value of the temperature may be. Experience shows that this constant noise level must be high enough to enable the proper operation of the servo-adjusting device, more particularly of the detector 8. That noise level which is high enough may, after amplification, exceed the threshold of the device 5.

The temporary lowering device 10 lowers the level of the polarisation voltage to a second level lower than the first level, that second level being low enough for the probability of exceeding the level pre-determined by a noise pulse to be very much smaller. That second level is, however, high enough for the level of the electric pulse sent out by the receiver 3 to be greater than the pre-determined threshold. This temporary lowering begins at the instant of emission of the laser pulse and its duration corresponds, for example, to the maximum range of the telemeter. That duration is evidently less than the response time of the servo-adjusting device, so as not to disturb its operation.

In these conditions, the probability for a noise pulse to be able, after amplification, to exceed the pre-determined threshold of the device 5 is extremely small. The electric pulse sent out by the receiver 3 on receiving the echo 4 and amplified by the amplifier 6 stops the operation of the measuring device 7. The interval of time measured, separating the emission of the pulse 2 from the receiving of the echo 4 is proportional to the distance from the telemeter to the target.

Figure 2:
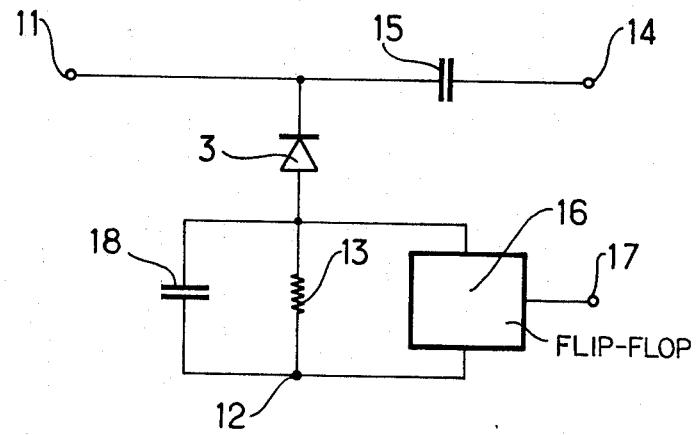
FIG. 2 is a more detailed diagram of a part of the telemeter shown in FIG. 1.

FIG. 2 shows more particularly an embodiment of the device 10 for lowering the temperature temporarily shown in FIG. 1.

In that FIG. 2, a photo-sensitive receiver 3 constituted by a photo-diode is reverse polarised by a difference in potential applied between a terminal 11 connected to the cathode of the receiver 3 and a terminal 12 connected to the anode of that receiver across a polarisation resistor 13.

The cathode of the receiver 3 is also connected to a terminal 14 connected to the amplifier 6 shown in FIG. 1, across a capacitor 15, for example.

The temporary lowering device is constituted by a monostable flip-flop 16 connected to a terminal 17 connected, for example, to the device for triggering the light pulse of the laser generator and by a capacitor 18 whose terminals are connected to the flip-flop 16 and arranged in parallel to the resistor 13. The triggering of a laser pulse unbalances the flip-flop 16 and causes the charging of the capacitor 18 at a voltage whose value opposes that of the polarisation voltage of the receiver 3. The flip-flop returns to its balanced state after a time which corresponds to the maximum range of the telemeter.

In another embodiment of the telemeter according to the invention, the temporary lowering device may comprise means for lowering successively the polarisation voltage to two distinct levels. The polarisation voltage is first lowered to a third level lower than the second level during a portion of the interval of time which corresponds to the range of the telemeter. That third level is sufficiently low for the level of the output pulses of the receiver 3, after amplification, to be lower than the pre-determined threshold of the device 5. The polarisation voltage is then brought progressively to the second level mentioned above and held at the level during the remainder of the interval of time. In these conditions, an interference echo of light pulses, caused, for example, by retrodiffusion of the laser pulse on a sheet of fog situated near the laser generator, cannot stop the operation of the measuring device 7.

The temporary lowering device, then, comprises, besides the flip-flop 16 shown in FIG. 2, another flip-flop, unbalanced also at the instant of the emission of the laser pulse and causing the charging of the capacitor 18 at a sufficiently high voltage to lower the polarisation voltage to that third level.

During the description of the laser telemeter described and illustrated in FIGS. 1 and 2, it has been seen that the laser telemeter according to the invention has the advantage of comprising a device for servo-adjusting the polarisation voltage of the receiver holding the noise of that receiver at a sufficiently high level to enable the operation of that servo-adjusting device, that telemeter having, nevertheless, a very small probability of triggering the time measuring device on a noise pulse.

It must be understood that the invention is in no way limited to the embodiments described and illustrated which have been given only by way of example. More particularly, without going beyond the scope of the invention, certain arrangements may be changed and certain means may be replaced by equivalent means.

What is claimed is:

1. Laser telemeter comprising:
   A laser generator capable of emitting a light pulse towards a target;
   A photo-sensitive receiver constituted by a photodiode to receive an echo of said light pulse, said photo-diode operating in the breakdown region;
   A threshold device responsive to the electric output pulses of said photodiode for blocking the electric pulses having a level lower than a predetermined threshold and for transmitting the electric pulses having a level higher than said predetermined threshold;
   A measuring device triggered at the instant of emission of said light pulse and responsive to the electric pulses transmitted by said threshold device for measuring the interval of time separating the emission of said light pulse and the receiving of the electric pulse transmitted by said threshold device;
   A servo-adjusting device receiving the output noise of said photo-diode and controlling the reverse polarization voltage in the breakdown state of said photo-diode to be maintained at a first level so as to hold said noise at a constant value, said first level being sufficiently high to enable the operation of the servo-adjusting device;
   A device for lowering temporarily the bias level of said photo-diode, the duration of said lowering being less than the response time of said servoadjusting device;
   Characterized in that said temporary lowering device comprises means for holding said reverse polarization voltage at a second level during the interval of time separating the emission of said light pulse and the receiving thereof by sid photo-diode, said second level being lower than said first level but sufficiently high for the level of the electric pulse sent out by said photo-diode on receiving said echo to be higher than said pre-determined threshold.

2. Telemeter according to claim 1, characterised in that the said temporary lowering device comprises, moreover, means for lowering, during a portion of said interval of time, the said polarisation voltage to a third level lower than the said second level and sufficiently low for the level of the output pulses of the said photodiode to be lower than the pre-determined threshold.

* * * * *